(12) United States Patent
Kim et al.

(10) Patent No.: US 12,124,225 B2
(45) Date of Patent: Oct. 22, 2024

(54) SATELLITE ANTENNA INTEGRATED TIME-SYNCHRONIZATION DEVICE

(71) Applicant: ENTEC ELECTRIC AND ELECTRONIC CO., LTD, Hwaseong-si (KR)

(72) Inventors: Young-Il Kim, Hwaseong-si (KR); Tae-Pung An, Hwaseong-si (KR); Heung-Ryeol Koh, Suwon-si (KR); Hee-Tae Park, Hwaseong-si (KR); Seok-Woo Lee, Hwaseong-si (KR); Nam-Hwan Kim, Suwon-si (KR); Jong-Mook Kang, Yongin-si (KR)

(73) Assignee: Entec Electric and Electronic Co., Ltd, Hwaseong-si (KR)

( * ) Notice: Subject to any disclaimer, the term of this patent is extended or adjusted under 35 U.S.C. 154(b) by 567 days.

(21) Appl. No.: 17/310,879

(22) PCT Filed: Mar. 29, 2019

(86) PCT No.: PCT/KR2019/003708
§ 371 (c)(1),
(2) Date: Aug. 27, 2021

(87) PCT Pub. No.: WO2020/204212
PCT Pub. Date: Oct. 8, 2020

(65) Prior Publication Data
US 2022/0146688 A1    May 12, 2022

(51) Int. Cl.
*G04G 7/00*    (2006.01)

(52) U.S. Cl.
CPC ..................... *G04G 7/00* (2013.01)

(58) Field of Classification Search
None
See application file for complete search history.

(56) References Cited

U.S. PATENT DOCUMENTS 3,910,540 A * 10/1975 Kayler .................. F21V 21/096
                                                     248/500

FOREIGN PATENT DOCUMENTS

| CN | 109412738 A | | 3/2019 |
| JP | 2017147647 A | * | 8/2017 |
| KR | 20-0363188 Y1 | | 9/2004 |
| KR | 10-0812789 B1 | | 3/2008 |
| KR | 20110042659 A | * | 4/2011 |

(Continued)

OTHER PUBLICATIONS

Translation of JP 2017147647, Espacenet (Year: 2024).*

(Continued)

*Primary Examiner* — Renee S Luebke
*Assistant Examiner* — Matthew Hwang
(74) *Attorney, Agent, or Firm* — Knobbe, Martens, Olson & Bear, LLP

(57) ABSTRACT

The present invention relates to a satellite antenna integrated time-synchronization device for generating a time-synchronization signal from a satellite signal received from a satellite, which includes a case, a 1PPS synchronization module which is disposed in the case and is configured to generate at least a 1PPS signal from the satellite signal, and a signal processing means which is disposed in the case and is configured to generate an IRIG signal and communication data using the 1PPS signal input from the 1PPS synchronization module.

12 Claims, 10 Drawing Sheets

(56) References Cited

FOREIGN PATENT DOCUMENTS

| KR | 20120017274 A | * | 2/2012 |
| KR | 20130134458 A | * | 12/2013 |
| KR | 10-1784408 B1 | | 10/2017 |

OTHER PUBLICATIONS

Translation of KR 20110042659, Espacenet (Year: 2024).*
Translation of KR 20130134458, Espacenet (Year: 2024).*
Translation of KR 20120017274, Google Patents (Year: 2024).*
International Search Report of PCT Application No. PCT/KR2019/003708—4 pages (Jan. 13, 2020).
Rajput, "Implementation of IRIG-B Output for Time Synchronization", International Journal of Advanced Research in Electronics and Communication Engineering, vol. 3, No. 5—3 pages (May 15, 2014).

* cited by examiner

FIG. 2
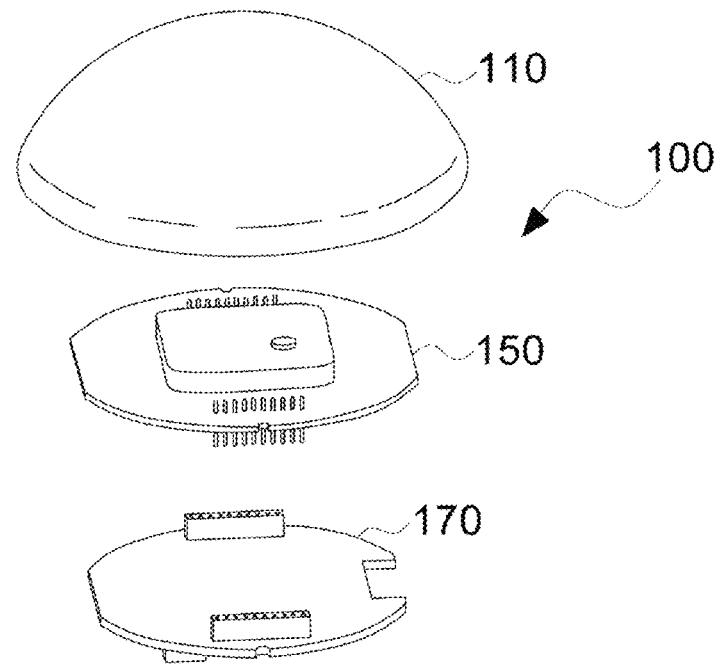
(a)
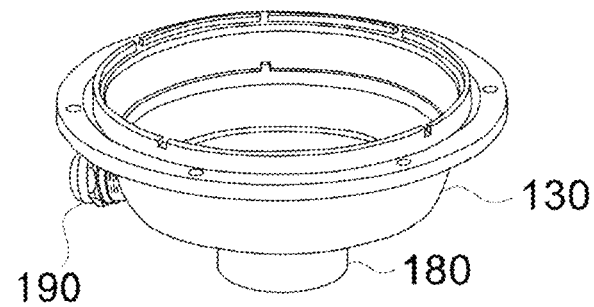
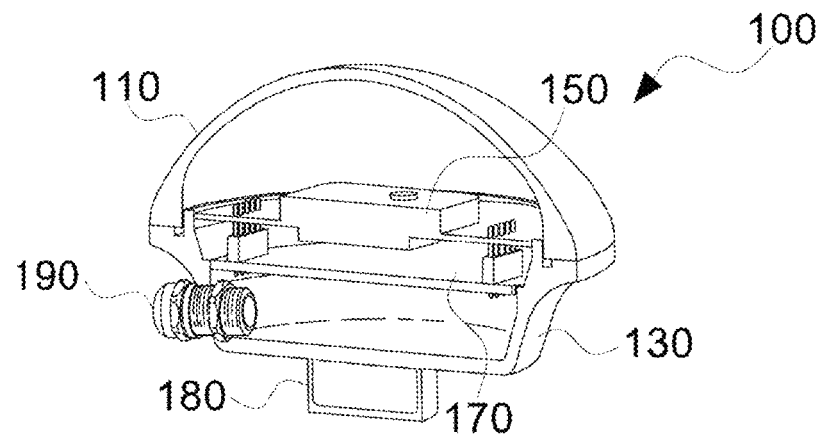
(b)

SATELLITE ANTENNA INTEGRATED TIME-SYNCHRONIZATION DEVICE

TECHNICAL FIELD

The present invention relates to a time-synchronization device, and more particularly, to a satellite antenna integrated time-synchronization device in which an antenna for receiving satellite information and a time-synchronization device are integrally formed in one body.

BACKGROUND ART

Various studies for monitoring a power supply status in a power system over a wide area have been conducted, and for this, time synchronization of the entire power system is essential.

As such a time-synchronization technique, there are techniques described in Patent Documents 1 and 2, etc., for example.

As shown in FIG. 1, these conventional time-synchronization devices include an antenna 10 for receiving a satellite signal including satellite information, and a time-synchronization means 50 configured to generate a pulse per second (1PPS) signal from the satellite signal received through the antenna, and generate an inter-range instrumentation group (IRIG) signal from the generated 1PPS signal, wherein the time-synchronization means and the antenna are connected to each other through a connection cable 30.

A time-synchronization function is not provided in significant number of power equipment control devices currently installed and operating in the power system to control various power equipment such as a circuit breaker, for example. In order to add the time-synchronization function to these power equipment control devices, there is a need to additionally install the time-synchronization device including the antenna 10 for receiving satellite information and the time-synchronization means 50 for generating and outputting a signal for time synchronization from the satellite information received by the antenna. To this end, it is necessary to secure an additional space for installing the time-synchronization device in the previously installed power equipment control device. However, for this purpose, it is necessary to replace the existing housing with a housing for a power equipment control device larger than the existing one, and the like, such that it is difficult to secure additional space in reality.

In addition, in the time-synchronization technique, a high-degree of time synchronization precision between the respective devices is required, but in the conventional time-synchronization device shown in FIG. 1, since the antenna 10 and the time-synchronization means 50 are formed as separate devices, and they are connected to each other using the cable 30, a problem of time delay between the antenna 10 and the time-synchronization means 50 may occur.

Further, in many cases, a means for visually confirming information on a current operating state of the power equipment to be controlled by the control device is not installed in the existing power equipment control devices. To this end, it is preferable that the time-synchronization device added to the previously installed power equipment control device is provided with a means capable of visually confirming the current operating state of the power equipment control device as well as the operating state of the time-synchronization device itself.

However, as confirmed by the present inventors, a prior art relating to the time-synchronization device having the above-described function could not be found.

Prior Art Document

Patent Document

Korean Patent Publication No. 10-2011-0042659 (published on Apr. 27, 2011)
Korean Patent Publication No. 10-2012-0017274 (published on Feb. 28, 2012)

SUMMARY OF INVENTION

Problems to be Solved by Invention

It is an object of the present invention to provide a satellite antenna integrated time-synchronization device in which an antenna for receiving a satellite signal and a signal processing device configured to generate a signal necessary for time synchronization from the satellite signal received by the antenna are integrally formed.

Another object of the present invention is to provide a time-synchronization device provided with a means capable of visually confirming the current operating state of the power equipment control device as well as the operating state of the time-synchronization device itself.

Means for Solving Problems

To achieve the above objects, according to an aspect of the present invention, there is provided a satellite antenna integrated time-synchronization device configured to generate a time-synchronization signal from a satellite signal received from a satellite, the device including: a case; a 1PPS synchronization module which is disposed in the case and is configured to generate at least a 1PPS signal from the satellite signal; and a signal processing means which is disposed in the case and is configured to generate an IRIG signal and communication data using the 1PPS signal input from the 1PPS synchronization module.

According to another aspect of the present invention, there is provided a satellite antenna integrated time-synchronization device configured to generate a time-synchronization signal from a satellite signal received from a satellite and output it to a power equipment control device, the device including: a 1PPS synchronization module configured to generate a 1PPS signal, satellite connection state information, and a UART communication signal from the satellite signal; and a signal processing means configured to generate a signal necessary for time synchronization of the power equipment control device using a signal output from the 1PPS synchronization module, wherein the signal processing means includes: a 1PPS signal verification means configured to verify the 1PPS signal; and a 1PPS synchronization IRIG signal generation means configured to generate and output an IRIG signal synchronized with the 1PPS signal using the 1PPS signal verified by the 1PPS signal verification means.

Advantageous Effects

According to the present invention, since the antenna for receiving a satellite signal and the signal processing device configured to generate a signal necessary for time synchronization from the satellite signal received by the antenna are integrally formed, it has an advantageous effect in terms of securing an installation space of the time-synchronization device when adding the time-synchronization function to the previously installed power equipment and the like.

In addition, according to the present invention, it is possible to easily visually confirm the operating state of the power equipment control device as well as the operating state of the time-synchronization device itself from an outside.

BRIEF DESCRIPTION OF DRAWINGS

FIG. 2 is a view illustrating a structure of a satellite antenna integrated time-synchronization device according to a preferred embodiment of the present invention;

MODE FOR CARRYING OUT INVENTION

Figure 1:
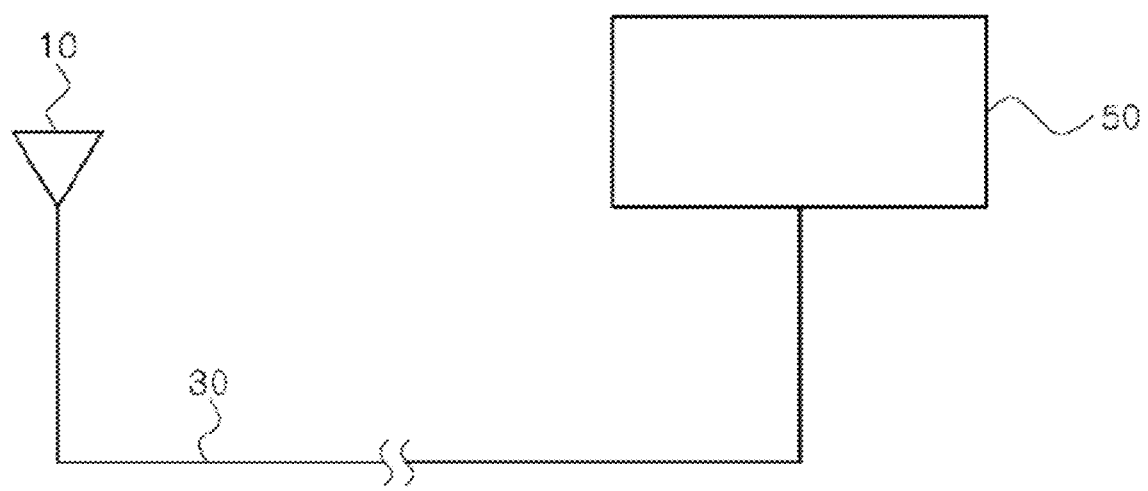
FIG. 1 is a schematic view illustrating an external appearance of a conventional time-synchronization device.

Hereinafter, a satellite antenna integrated time-synchronization device according to a preferred embodiment of the present invention will be described in detail with reference to the accompanying drawings.

First, a structure of the time-synchronization device of the preferred embodiment of the present invention will be described with reference to FIG. 2. FIG. 2 is a view illustrating a structure of the satellite antenna integrated time-synchronization device according to the preferred embodiment of the present invention, wherein (a) is an exploded perspective view of the time-synchronization device, and (b) is a cross-sectional view thereof.

As shown in FIG. 2, a time-synchronization device 100 according to the preferred embodiment of the present invention includes a case body including an upper case 110 and a lower case 130, a 1PPS synchronization module 150 and a signal processing unit 170, which are installed in the case body.

The 1PPS synchronization module 150 is also responsible for the function of an antenna for receiving a satellite signal which is received by the time-synchronization device 100 from a satellite.

In addition, a permanent magnet 180 is installed at an appropriate position on a lower surface of the lower case 130 of the time-synchronization device 100. The time-synchronization device 100 of the present invention may be simply attached to an outside of a housing of the power equipment control device, which is made of a magnetic material, by means of the permanent magnet 180. However, a method of installing the time-synchronization device 100 in the power equipment control device is not limited thereto. For example, a method of drilling a hole for installing the time-synchronization device 100 in the housing of the power equipment control device and directly attaching the time-synchronization device 100 to the power equipment control device by screwing using a screw inserted into the hole may be used.

In addition, the time-synchronization device 100 includes a cable lead-out part 190 which is installed on any one of the upper case 110 and the lower case 130, and an output signal of the signal processing unit 170 is output to a power equipment control device 200 through the cable lead-out part 190.

Figure 3:
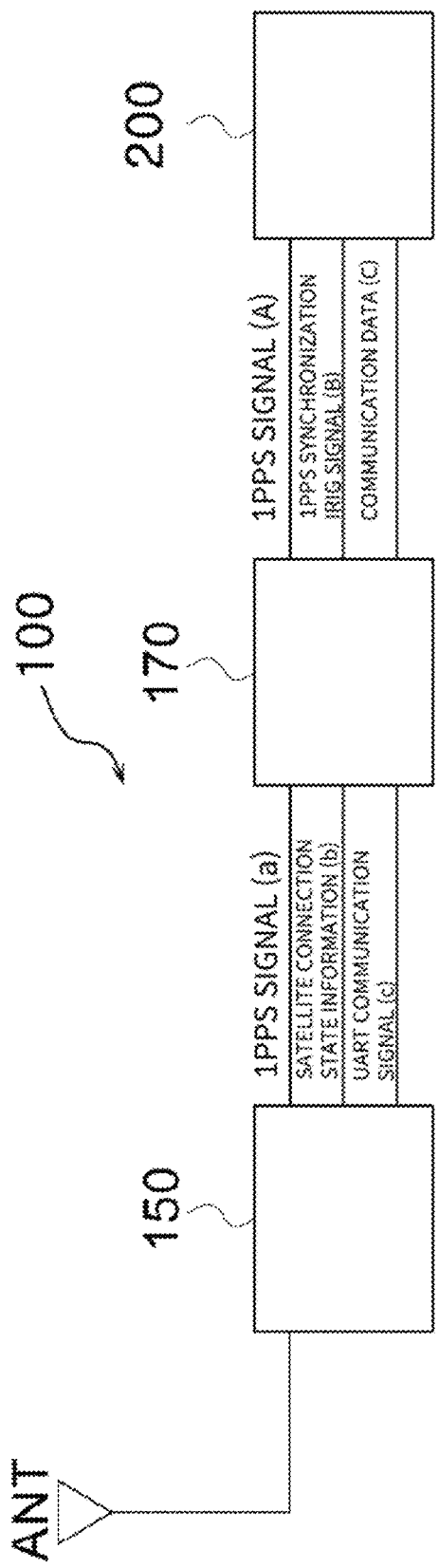
FIG. 3 is a functional block diagram of a phase-synchronization device of the preferred embodiment of the present invention.

Next, an internal configuration of the time-synchronization device 100 according to the preferred embodiment of the present invention will be described. FIG. 3 is a functional block diagram of a phase-synchronization device of the preferred embodiment of the present invention.

As shown in FIG. 3, the time-synchronization device 100 of the present embodiment includes an antenna ANT, the 1PPS synchronization module 150, and the signal processing unit 170. The output signal of the signal processing unit 170 is output to the power equipment control device 200.

The global positioning system (GPS) of the United States, GLONASS of Russia, etc. may be used as satellites. The antenna ANT receives a satellite signal including satellite information such as time information and position information from these satellites.

The 1PPS synchronization module 150 generates a 1PPS signal (a), satellite connection state information (b), and a UART communication signal (c) from the satellite signal received by the antenna ANT, and outputs it to the signal processing unit 170.

The 1PPS signal (a) is a signal generated from the satellite signal received by the antenna ANT, and is a signal in which one pulse is output per second. The satellite connection state information (b) is a signal indicating a connection state (on/off state) between the satellite such as GPS and the time-synchronization device 100. In addition, the universal asynchronous receiver/transmitter (UART) communication signal (c) is a signal indicating the time and location information generated from the satellite signal received by the antenna ANT, and is output in the National Marine Electronics Association 0183 (NMEA-0183) data format (also called NMEA sentence) which is an international standard for transmitting information such as time, latitude, longitude and the like.

In the present embodiment, the 1PPS synchronization module 150 uses a known configuration, and therefore will not be further described in detail.

The signal processing unit 170 generates a 1PPS signal (A), a 1PPS synchronization IRIG signal (B), and communication data (C) from the output signal of the 1PPS synchronization module 150, and outputs the generated signals and data to the power equipment control device 200.

Next, the signal processing unit 170 will be described in detail.

Figure 4:
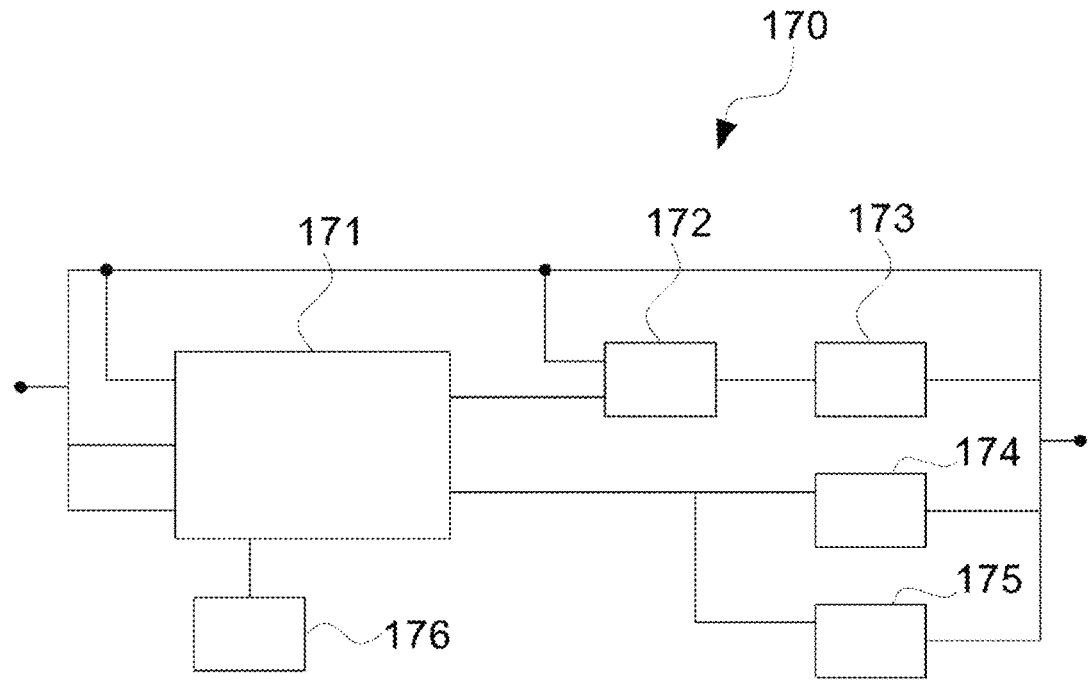
FIG. 4 is a block diagram illustrating a configuration of a signal processing module according to the preferred embodiment of the present invention.

First, a configuration of the signal processing unit 170 will be described. FIG. 4 is a block diagram illustrating the configuration of the signal processing module according to the preferred embodiment of the present invention.

As shown in FIG. 4, the signal processing unit 170 includes a signal processing module 171, a time delay compensation circuit 172, a gate driver 173, an RS485 converter 174, an RS232 converter 175, and a display unit 176.

The 1PPS signal (a), which is input from the 1PPS synchronization module 150 to the signal processing unit 170, is input to the signal processing unit 170 as well as to the time delay compensation circuit 172 at the same time. In addition, a part of the 1PPS signal input to the signal processing unit 170 is output to the power equipment control device 200 as it is input without undergoing any processing in the signal processing unit 170. Further, the satellite connection state information (b) and the UART communication signal (c) among the output signals of the 1PPS synchronization module 150 are also input to the signal processing module 171.

By using the 1PPS signal (a), the satellite connection state information (b), and the UART communication signal (c) input from the 1PPS synchronization module 150, the signal processing module 171 generates an IRIG signal etc. required for time synchronization of the power equipment control device 200, and outputs it to the power equipment control device 200, so as to visually display information on operating states of the time-synchronization device 100 itself and the power equipment control device 200.

Figure 5:
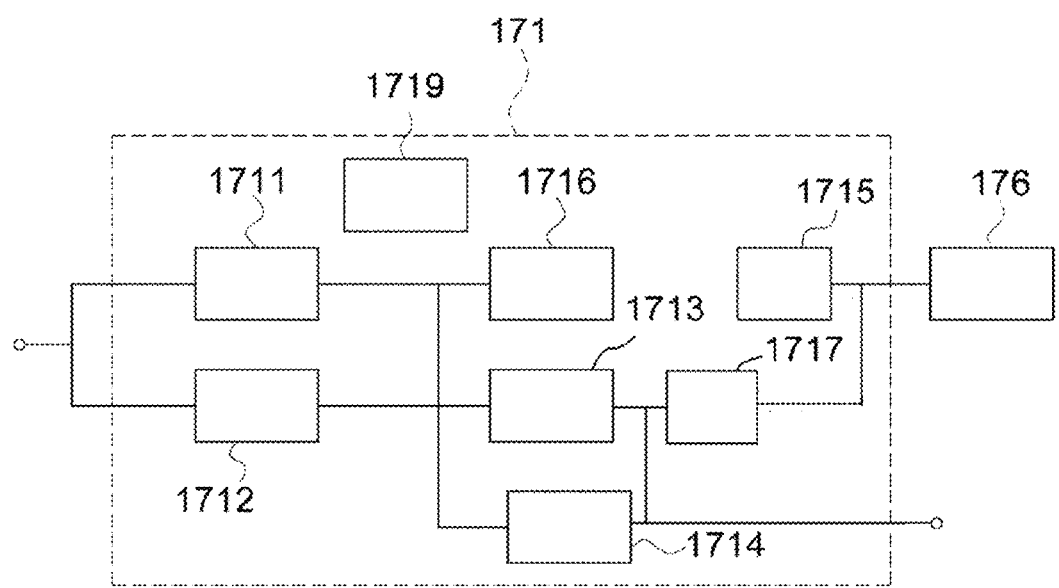
FIG. 5 is a functional block diagram of a signal processing unit according to the preferred embodiment of the present invention.

The signal processing module 171 will be described in detail with reference to FIG. 5. FIG. 5 is a functional block diagram of the signal processing unit according to the preferred embodiment of the present invention.

The signal processing module 171 includes a 1PPS signal verification unit 1711, a satellite connection state confirmation and 1PPS synchronization unit 1712, a 1PPS synchronization IRIG signal generation unit 1713, a communication data generation unit 1714, a control device state confirmation unit 1715, an internal RTC 1716, an IRIG state confirmation unit 1717, and a controller 1719.

The 1PPS signal verification unit 1711 is configured to verify whether the 1PPS signal input from the 1PPS synchronization module 150 is valid. The satellite connection state confirmation and 1PPS synchronization unit 1712 is configured to confirm the connection state between the antenna ANT of the time-synchronization device 100 and the satellite based on the satellite connection state information (b) input from the 1PPS synchronization module 150, and if it is determined that the satellite connection state is normal, synchronize the satellite connection state information (b) with the 1PPS signal to generate the satellite connection state information synchronized with the 1PPS signal. 1PPS signal verification method and satellite connection state verification method will be described below in detail.

The 1PPS synchronization IRIG signal generation unit 1713 is configured to generate an IRIG signal synchronized with the 1PPS signal using the 1PPS signal (a) input from the 1PPS synchronization module 150. In the present embodiment, the 1PPS synchronization IRIG signal generation unit 1713 generates a signal in an IRIG format synchronized with the 1PPS signal.

The IRIG signal is a signal format including data required for time synchronization among satellite information, and consists of the predetermined number of characters indicating a time information format and the predetermined number of numerals indicating properties of the IRIG signal. Herein, both the IRIG signal and a method of generating this signal are techniques know in the art, and therefore will not be described in detail.

The communication data generation unit 1714 is configured to generate an NMEA sentence using the UART communication signal (c) input from the 1PPS synchronization module 150. Herein, the NMEA sentence also uses the technique known in the art, and therefore will not be described in detail.

The control device state confirmation unit 1715 is configured to confirm the state of the power equipment controlled by the power equipment control device 200, for example, the current state of the power equipment control device 200 such as whether the power equipment is in a closed state or an open state, or whether the power equipment control device is operating normally etc., while communicating with the power equipment control device 200. The confirmed results are displayed using a display unit 176, which will be described below, so as to allow a user to visually confirm them.

The internal real-time clock (RTC) 1716 is a real-time clock generation device built into the signal processing module 171. If it is determined that the satellite connection state is not normal as a result of confirmation by the satellite connection state confirmation and 1PPS synchronization unit 1712, the signal processing module 171 generates the 1PPS synchronization IRIG signal (B) and communication data (C) using the internal RTC 1716.

The IRIG state confirmation unit 1717 confirms an output state of the IRIG generated and output by the 1PPS synchronization IRIG signal generation unit 1713, and displays it on the display unit 176.

The controller 1719 is configured to control each of the units. For reference, in FIG. 5, the controller 1719 is shown independently from other components, but this is only for the convenience of illustration, and is actually connected with each component of the signal processing module 171.

Figure 6:
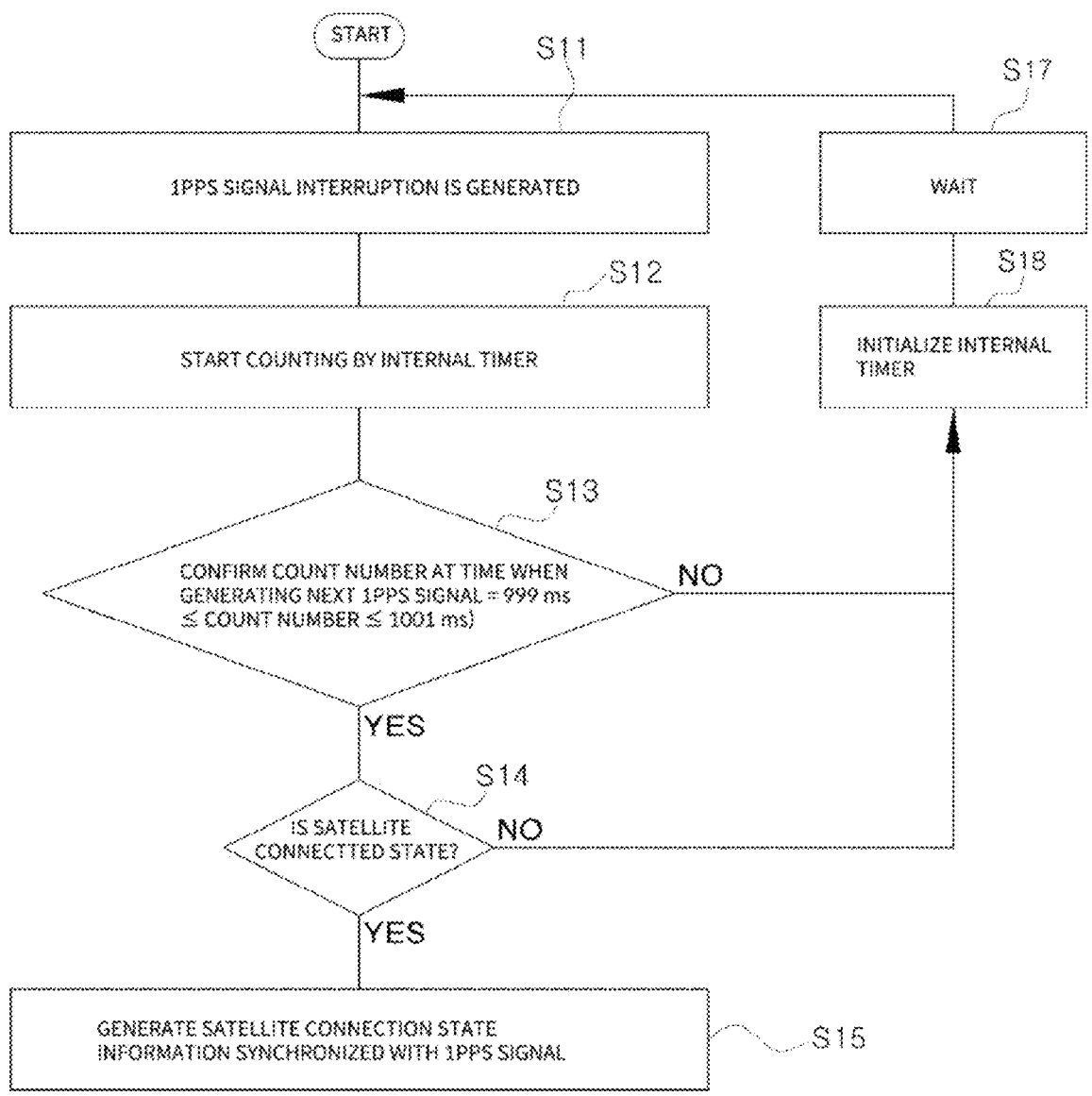
FIG. 6 is a flowchart illustrating a flow of 1PPS signal verification processing.
Figure 7:
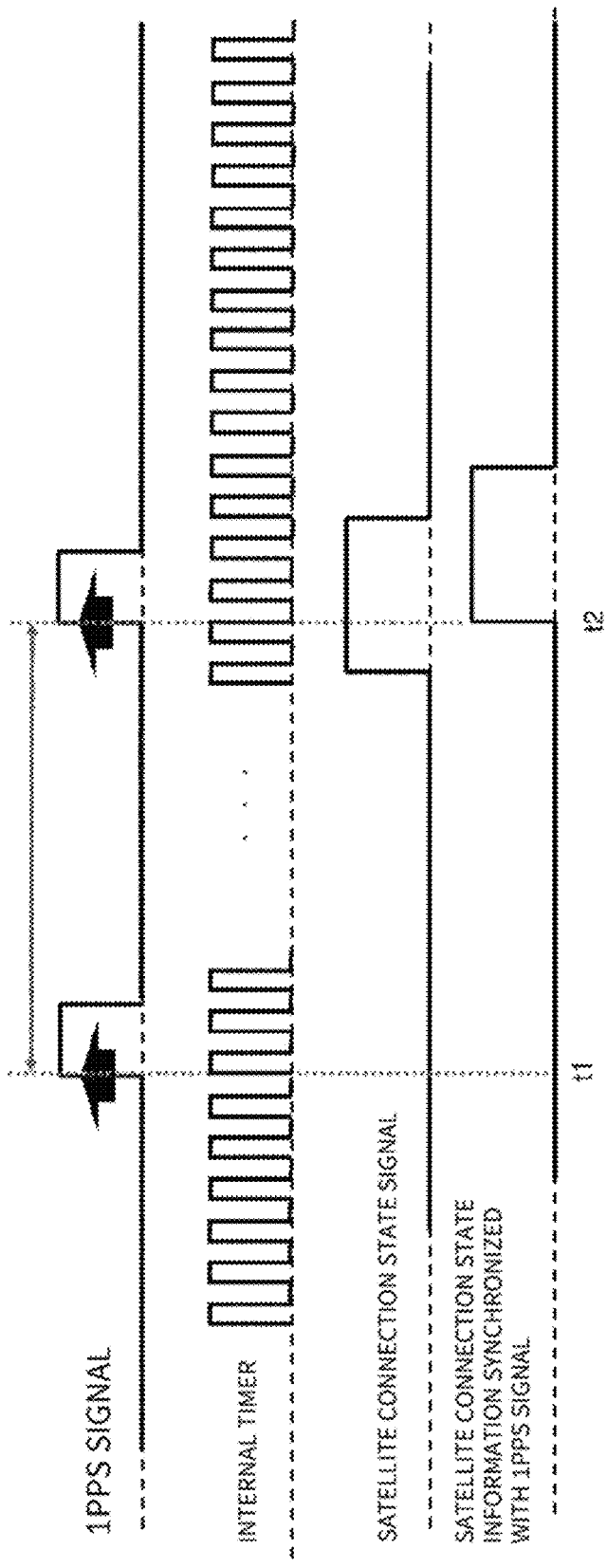
FIG. 7 is a view illustrating output waveforms for each step in the 1PPS signal verification processing.

Subsequently, 1PPS signal verification processing by the 1PPS signal verification unit 1711 will be described with reference to FIGS. 6 and 7. FIG. 6 is a flowchart illustrating a flow of the 1PPS signal verification processing, and FIG. 7 is a view illustrating output waveforms for each step in the 1PPS signal verification processing.

First, in step S11, when a 1PPS signal interruption is generated, the processing proceeds to step S12. In step S12, the controller 1719 controls the 1PPS signal verification unit 1711 to make an internal timer (not shown) of the 1PPS signal verification unit 1711 to start counting. The internal timer of the 1PPS signal verification unit 1711 counts one number per 1 ms, and the 1PPS signal is a pulse signal that occurs once per second, such that there is a time difference of 1,000 ms between the 1PPS signal and the next 1PPS signal. In step S13, the 1PPS signal verification unit 1711 confirms a count number of the internal timer when the next 1PPS signal is generated, and if the count number of the internal timer at the time when generating the next 1PPS signal is between 999 ms and 1001 ms (i.e., 999 ms≤count number of internal timer≤1001 ms) (step S13: YES), the processing proceeds to step S14.

In step S14, the controller 1719 controls the satellite connection state confirmation and 1PPS synchronization unit 1712 to determine the satellite connection state by confirming whether the satellite connection state information (b) is input from the 1PPS synchronization module 150.

Subsequently, if it is determined that the satellite connection state is normal as a result of the confirmation in step S14 (step S14: YES), the controller 1719 controls the satellite connection state confirmation and 1PPS synchronization unit 1712 to synchronize the satellite connection state information (b) input from the 1PPS synchronization module 150 with the 1PPS signal, and generate and output the satellite connection state information synchronized with the 1PPS signal. Thereafter, the processings of steps S11 to S15 are repeated.

As a result of the confirmation in step S13, if the count number of the internal timer is not between 999 ms and 1001 ms at the time of generating the next 1PPS signal (step S13: NO), the processing proceeds to step S18. In step S18, the controller 1719 initializes the internal timer, proceeds the processing to step S17, and waits until the next 1PPS signal is generated. When the next 1PPS signal is generated, the processings after step S11 are repeated.

Referring to FIG. 7, when a 1PPS signal interruption is generated at time t1, counting by the internal timer is started in step S12. If the count number of the internal timer is within the above range (999 ms≤count number of internal timer≤1001 ms) in step S13, the controller confirms the satellite connection state information obtained based on the satellite connection state information (b) input from the 1PPS synchronization module 150 at time t2 (step S15). In this case, the satellite connection state information (b) input from the 1PPS synchronization module 150 may not be synchronized with the 1PPS signal in the art. However, according to the present embodiment, the controller generates and outputs the satellite connection state information synchronized with the 1PPS signal by synchronizing the satellite connection state information (b) at time t2, that is, at the time of generating the next 1PPS signal interrupt.

Figure 8:
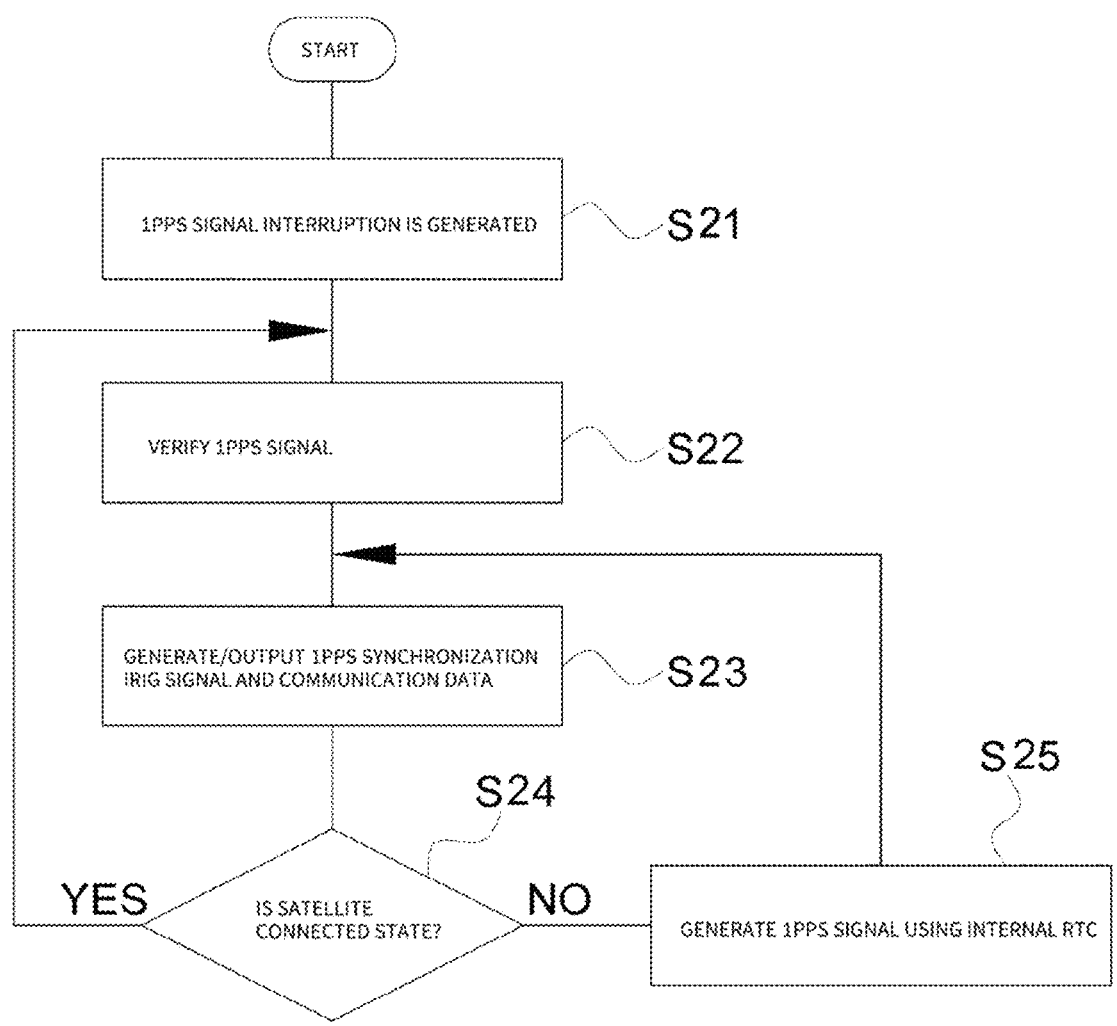
FIG. 8 is a flowchart illustrating a flow of IRIG signal and NMEA sentence generation processing.
Figure 9:
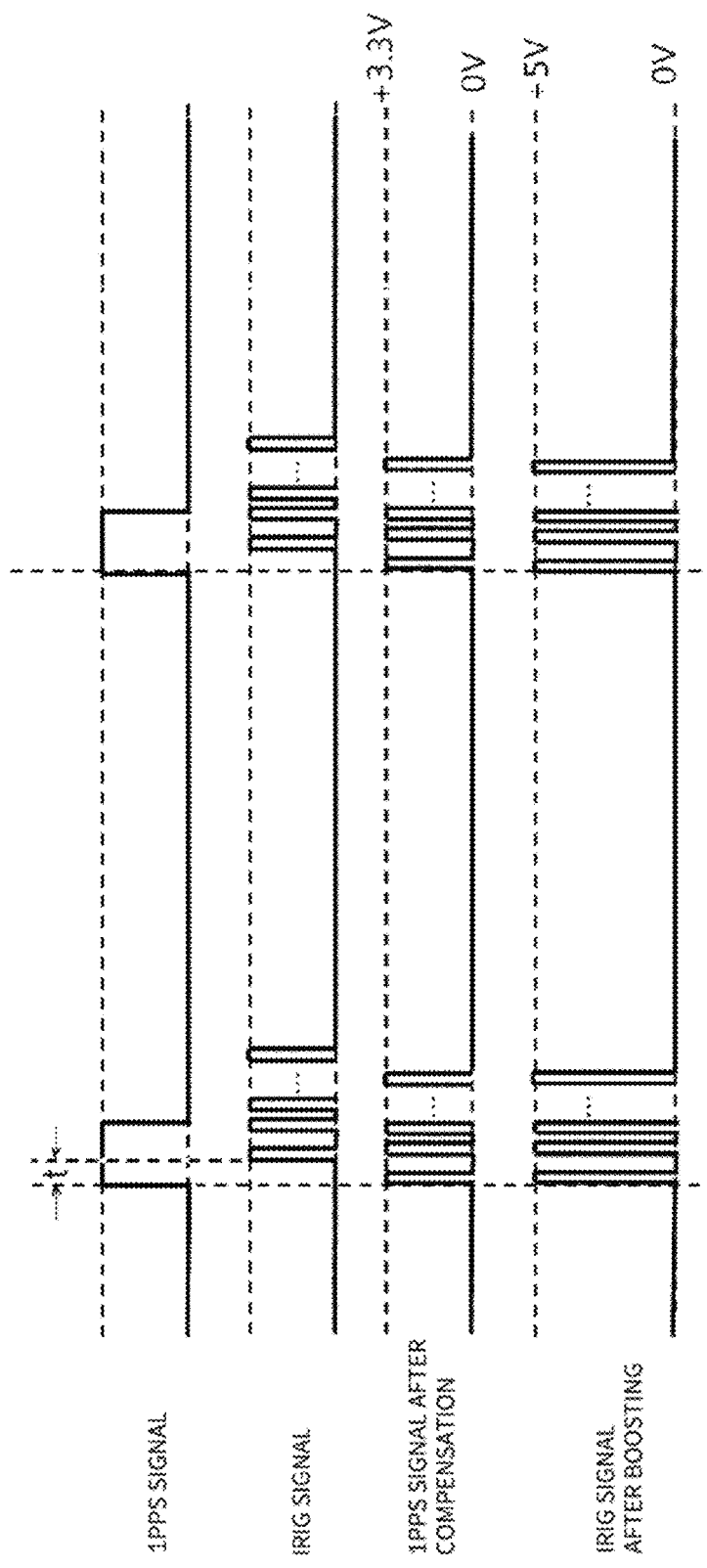
FIG. 9 is a view illustrating output waveforms of each part in the signal processing module.

Subsequently, IRIG signal and NMEA sentence generation processing will be described with reference to FIGS. 8 and 9. FIG. 8 is a flowchart illustrating a flow of the IRIG signal and NMEA sentence generation processing, and FIG. 9 is a view illustrating output waveforms of each unit in the signal processing module.

First, when a 1PPS interruption is generated in step S21, the controller 1719 controls the 1PPS signal verification unit 1711 to execute the 1PPS signal verification processing in step S22. The 1PPS signal verification processing in step S22 corresponds to the processing described above using FIGS. 6 and 7.

When the 1PPS signal verification is performed in step S22, the controller 1719 controls the 1PPS synchronization IRIG signal generation unit 1713 and the communication data generation unit 1714 in step S23 to generate and output the 1PPS synchronization IRIG signal synchronized with the 1PPS signal and communication data (NMEA sentence format).

Then, the processing proceeds to step S24, and the controller 1719 controls the satellite connection state confirmation unit 1712 to determine the connection state between the antenna ANT and the satellite by confirming whether the satellite connection state information (b) is normally input from the 1PPS synchronization module 150. If it is determined that the satellite connection state is good, i.e., normal (step S24: YES), the processing returns to step 22, and the processings of the subsequent steps are repeated.

If it is determined that the satellite connection state is bad, i.e., abnormal as a result of the confirmation in step S24 (step S24: NO), the processing proceeds to step S25. In this step, the controller 1719 controls the internal RTC 1716 to generate an internal real-time clock, and the processings after the step 23 are executed.

Subsequently, processing by the signal processing unit 170 performed on the IRIG signal generated by the 1PPS synchronization IRIG signal generation unit 1713 of the signal processing module 171 will be further described with reference to FIG. 9 illustrating output waveforms from each unit of the signal processing module together with FIG. 4.

The IRIG signal generated in the 1PPS synchronization IRIG signal generation unit 1713 is generated during the processings described in FIGS. 6 and 8, for example. In this process, for example, there is a problem that a delay of time t occurs shown in FIG. 9, and thereby the synchronization with the 1PPS signal is not matched.

Therefore, in the present embodiment, the delay time is compensated using the time delay compensation circuit 172, so that the IRIG signal output from the signal processing module 171 is synchronized with the 1PPS signal (see the IRIG signal after the compensation in FIG. 9).

In addition, the IRIG signal output from the signal processing module 171 is a signal having a voltage level of 3.3V, for example, and there is a problem that the signal processing module 171 using a microcontroller composed of semiconductor elements cannot supply a power to a high impedance load due to its structure.

Therefore, the signal processing unit 170 of the present embodiment includes the gate driver 173 additionally installed in the signal processing module 171. Accordingly, the voltage level of the IRIG signal output to the power equipment control device 200 is boosted to 5 V, for example, so that the impedance of the load may be increased (see the IRIG signal after boosting in FIG. 9).

In addition, communication data generated and output by the communication data generation unit 1714 of the signal processing module 171 is converted to be suitable for RS485 communication and RS232 communication through the RS485 converter 174 and the RS232 converter 175, respectively, and is output to the power equipment control device 200. Accordingly, the power equipment control device 200 may select and use a method suitable for its own communication method from among the RS485 or RS232 communication method.

Further, as described above, the signal processing unit 170 of the present embodiment is configured to simultaneously provide the 1PPS signal to the power equipment control device 200 together with the IRIG signal generated using the 1PPS signal. Therefore, the power equipment control device 200 may select and use a signal suitable for its own method.

Figure 10:
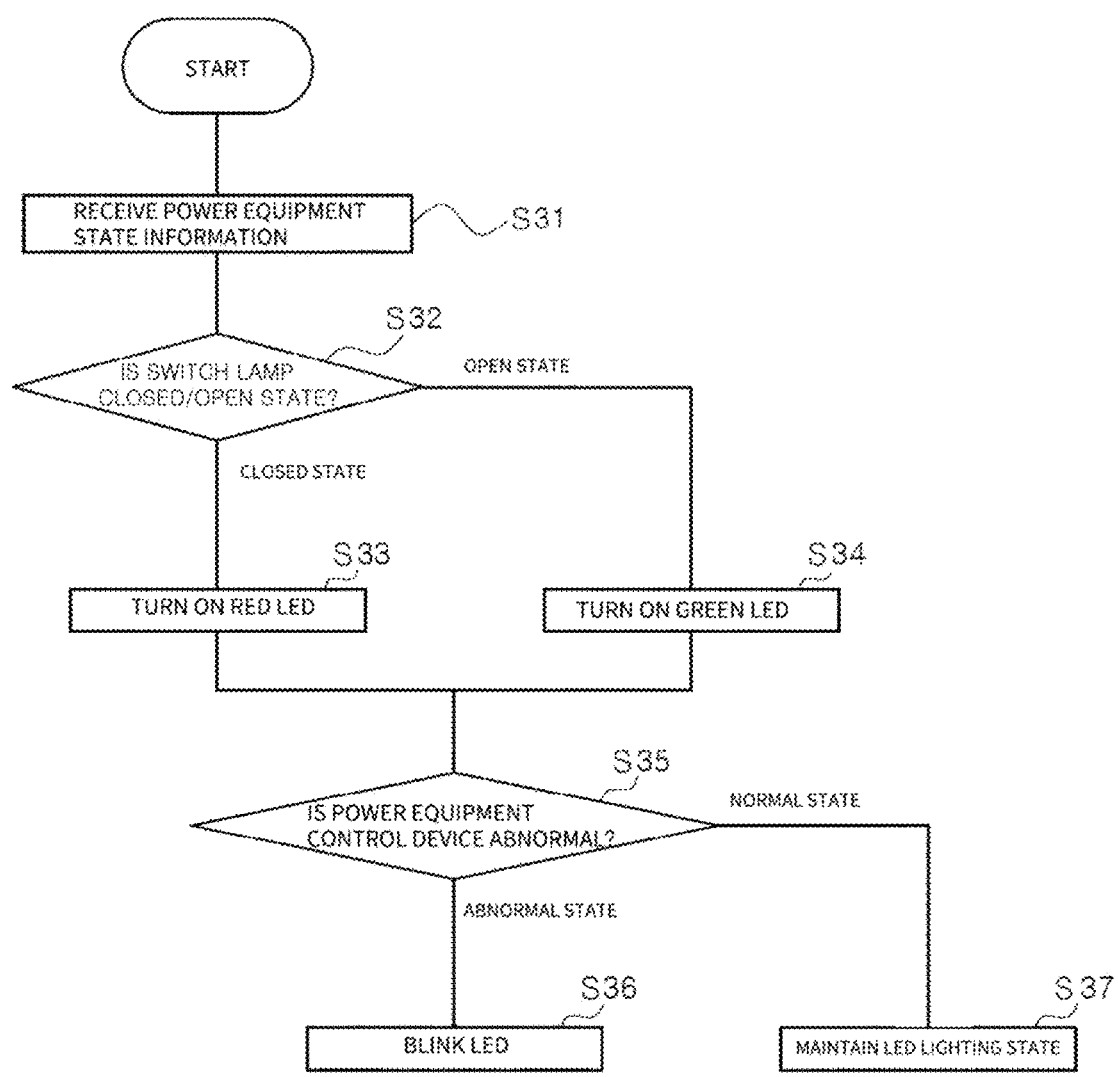
FIG. 10 is a flowchart illustrating a flow of processing for displaying an operating state of a power equipment control device.

Next, processing for displaying an operating state of the power equipment control device 200 will be described with reference to FIG. 10. FIG. 10 is a flowchart illustrating a flow of the processing for displaying an operating state of the power equipment control device.

First, in step S31, the controller 1719 controls the control device state confirmation unit 1715 to receive current state information from the power equipment control device 200. Herein, the state information is, for example, information on whether the power equipment controlled by the power equipment control device 200 is in the closed or the open state, or whether the power equipment control device 200 is operating normally.

Next, if the power equipment controlled by the power equipment control device 200 is not in the closed state in step S32, the control device state confirmation unit 1715 confirms whether it is in the open state, whereas if it is in the closed state, a red LED of the display unit 176 which indicates the closed state of the power equipment is turned on (step S33), for example. Meanwhile, as a result of determination in step S32, if it is determined that the power equipment is in the open state, a green LED of the display unit 176 which indicates the open state of the power equipment is turned on, for example (step S34).

Herein, the display unit 176 is a display device which may be disposed at an appropriate position of the time-synchronization device 100, for example, on the upper case 110, to display a plurality of different colors by turning on, off, or blinking, and LEDs may be used as a light source.

Then, the processing proceeds to step S35, and the control device state confirmation unit 1715 confirms whether there is an abnormality in the power equipment control device 200. As a result of the confirmation, if it is determined that there is an abnormality, an LED for indicating an abnormal state of the power equipment control device 200, for example, indicating an abnormal state of the display unit 176, is displayed in a blinking state in step S36, and if it is determined that there is no abnormality, the lighting state of step S33 or S34 is maintained (step S37).

Thereby, the user may visually and simply confirm the operating state of the power equipment control device 200 through the display unit 176 of the time-synchronization device 100.

Figure 11:
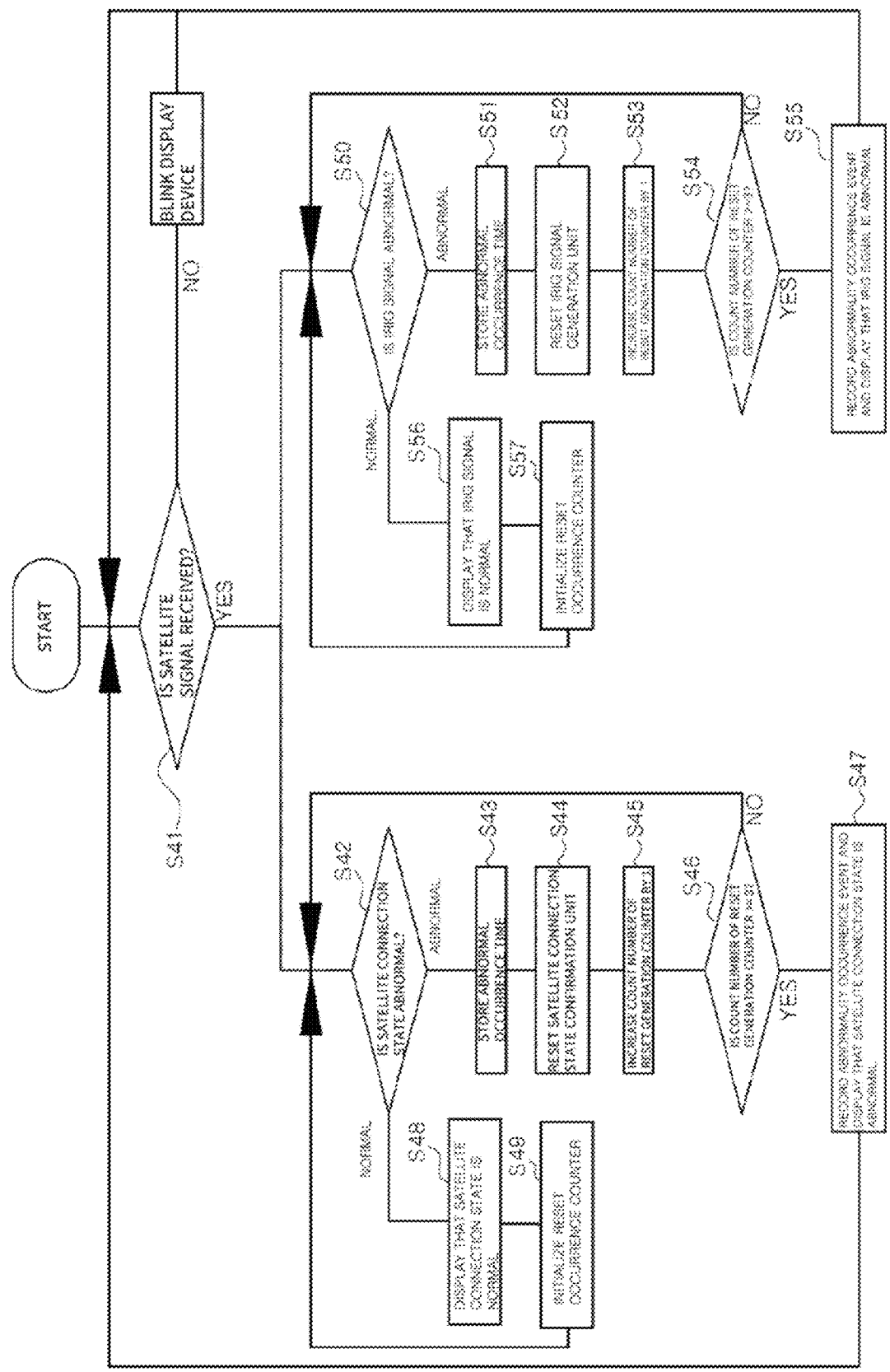
FIG. 11 is a flowchart illustrating a flow of processing for displaying an operating state of the time-synchronization device.

Next, a method of confirming and displaying the satellite connection state and IRIG signal output state will be described with reference to FIG. 11. FIG. 11 is a flowchart illustrating a flow of processing for displaying the operating state of the time-synchronization device.

First, in step S41, the controller 1719 controls the 1PPS signal verification unit 1711 to confirm whether the satellite signal is normally received. The satellite signal reception state may be determined by confirming whether the 1PPS signal (a) is normally received from the 1PPS synchronization module 150 or the like.

As a result of the confirmation in step S41, if it is determined that the satellite signal is being normally received, the controller 1719 controls the satellite connection state confirmation unit 1712 to confirm the satellite connection state in step S42. The satellite connection state determination may be performed by confirming whether the satellite connection state information (b) is normally received from the 1PPS synchronization module 150.

As a result of the confirmation in step S42, if it is determined that the satellite connection state is bad (step S42: ABNORMAL), the processing proceeds to step S43. In this step, the controller stores an abnormal occurrence time in a storage medium (not shown), resets the satellite connection state confirmation unit 1712 in step S44, and then increases the count number of a reset generation counter (not shown) by 1 in step S45.

Then, the processing proceeds to step S46, and the controller confirms a count number of the reset generation counter, and if the count number of the reset generation counter is 3 or more (step S46: YES), records an abnormality occurrence event of the satellite connection state in the storage medium (not shown), and turns on an LED of the display unit 176 for indicating that the satellite connection state is abnormal to display that the satellite connection state is abnormal in step S47. Then, the processing returns to step S41.

Further, as a result of the confirmation in step S46, if it is determined that the count number of the reset generation counter is less than 3, the processing returns to step S42 and the subsequent routine is repeated.

As a result of the determination in step S42, if it is determined that the satellite connection state is normal, the processing proceeds to step S48. In this step, the controller turns on an LED of the display unit 176 for indicating that the satellite connection state is normal to display that the satellite connection state is normal, and initializes the reset occurrence counter in step S49. Then, the processing returns to step S41.

In addition, if it is determined that the satellite signal is being normally received in step S41, the processing proceeds to step S50, and the controller 1719 controls the IRIG state confirmation unit 1717 to confirm whether the 1PPS synchronization IRIG signal generated and output by the 1PPS synchronization IRIG signal generation unit 1713 is abnormal.

As a result of the confirmation in step S50, for example, if it is determined that an abnormality has occurred, such as that the 1PPS synchronization IRIG signal (B) is not normally output from the 1PPS synchronization IRIG signal generation unit 1713, or the like, the controller stores the abnormal occurrence time in the storage medium in step S51, and resets the 1PPS synchronization IRIG signal generation unit 1713 in step S52. Next, the controller increases the count number of the reset counter (not shown) by 1 in step S53, and then confirms the count number of the reset counter in step S54.

As a result of the confirmation in step S54, if the count number of the reset occurrence counter is 3 or more, the controller records an abnormality occurrence event of the 1PPS synchronization IRIG signal (B) in the storage medium (not shown) in step S55, and turns on an LED of the display unit 176 for indicating that the 1PPS synchronization IRIG signal (B) is abnormal. Thereafter, the processing returns to step S50, and the subsequent routine is repeated.

In addition, if the count number of the reset generation counter is less than 3 in step S54, the processing returns to step S50, and the subsequent routine is repeated.

Further, if it is determined that the 1PPS synchronization IRIG signal (B) is normal in step S50, the processing proceeds to step S56, and the controller turns on an LED of the display unit 176 for indicating that the 1PPS synchronization IRIG signal (B) is in a normal state in step S56, and then initializes the reset generation counter in step S57. Thereafter, the processing returns to step S50, and the subsequent routine is repeated.

While the present invention has been described with reference to the preferred embodiment, the present invention is not limited to the above-described embodiment, and various modifications and variations may be made within the scope of the present invention as defined by the appended claims without departing therefrom.

DESCRIPTION OF REFERENCE NUMERALS

100: Time-synchronization device
110: Upper case
130: Lower case
150: 1PPS synchronization module
170: Signal processing unit
171: Signal processing module
172: Delay time compensation circuit
173: Gate driver
174: RS485 converter
175: RS232 converter
176: Display unit
180: Permanent magnet
200: Power equipment control device

The invention claimed is:

1. A satellite antenna integrated time-synchronization device configured to generate a time-synchronization signal from a satellite signal received from a satellite, the device comprising:

a case;
a 1PPS synchronization module which is disposed in the case and is configured to generate at least a 1PPS signal from the satellite signal; and
a signal processing means which is disposed in the case and is configured to generate an IRIG signal and communication data using the 1PPS signal input from the 1PPS synchronization module and confirm operating states of a power equipment control device or power equipment.

2. The satellite antenna integrated time-synchronization device according to claim 1, wherein the case comprises of an upper case and a lower case, and
the lower case includes a permanent magnet installed therein to attach the case to a power equipment control device.

3. A satellite antenna integrated time-synchronization device configured to generate a time-synchronization signal from a satellite signal received from a satellite and output it to a power equipment control device, the satellite antenna integrated time-synchronization device comprising:
a 1PPS synchronization module configured to generate a 1PPS signal, satellite connection state information, and a UART communication signal from the satellite signal; and
a signal processing means configured to generate a signal necessary for time synchronization of the power equipment control device using a signal output from the 1PPS synchronization module,
wherein the signal processing means comprises:
a 1PPS signal verification means configured to verify the 1PPS signal; and
a 1PPS synchronization IRIG signal generation means configured to generate and output an IRIG signal synchronized with the 1PPS signal using the 1PPS signal verified by the 1PPS signal verification means.

4. The satellite antenna integrated time-synchronization device according to claim 3, wherein the signal processing means further comprises a satellite connection state confirmation means configured to generate satellite connection state information synchronized with the 1PPS signal using the satellite connection state information.

5. The satellite antenna integrated time-synchronization device according to claim 3, wherein the signal processing means further comprises a gate driver configured to boost a voltage level of the IRIG signal synchronized with the 1PPS signal.

6. The satellite antenna integrated time-synchronization device according to claim 3, wherein the signal processing means further comprises:

an IRIG state confirmation means configured to verify whether the IRIG signal synchronized with the 1PPS signal is abnormal; and
a display means configured to visually display whether the IRIG signal synchronized with the 1PPS signal is abnormal according to confirmation results of the IRIG state confirmation means.

7. The satellite antenna integrated time-synchronization device according to claim 3, wherein the signal processing means outputs the 1PPS signal and the IRIG signal synchronized with the 1PPS signal together.

8. The satellite antenna integrated time-synchronization device according to claim 3, wherein the signal processing means further comprises:
a control device state confirmation means configured to confirm operating states of the power equipment control device and power equipment; and
a display means configured to visually display the operating states of the power equipment control device and the power equipment according to confirmation results of the control device state confirmation means.

9. The satellite antenna integrated time-synchronization device according to claim 4, wherein the signal processing means further comprises a communication data generation unit configured to generate and output communication data using the 1PPS signal synchronized with the 1PPS signal and the satellite connection state information synchronized with the 1PPS signal.

10. The satellite antenna integrated time-synchronization device according to claim 4, further comprising a display means configured to visually display the satellite connection state according to confirmation results of the satellite connection state confirmation means.

11. The satellite antenna integrated time-synchronization device according to claim 1, wherein the signal processing means further comprises:
a control device state confirmation means configured to confirm the operating states of the power equipment control device or the power equipment; and
a display means configured to visually display the operating states of the power equipment control device and the power equipment according to confirmation results of the control device state confirmation means.

12. The satellite antenna integrated time-synchronization device according to claim 1, wherein the signal processing means outputs the 1PPS signal and the IRIG signal synchronized with the 1PPS signal together.

* * * * *